L. A. SICARD.
Apparatus for Preserving Fruits, &c.
No. 151,443. Patented May 26, 1874.
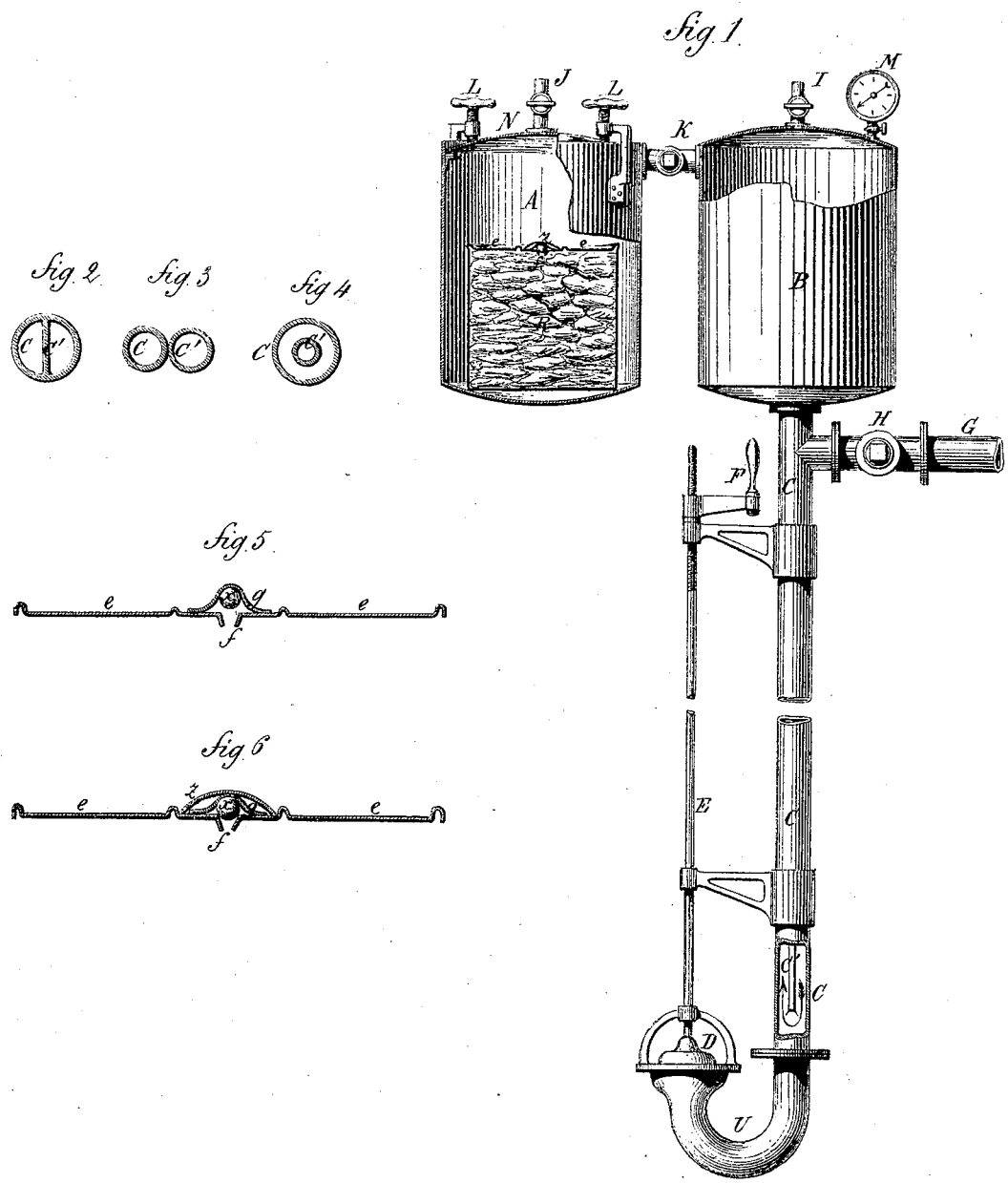

UNITED STATES PATENT OFFICE.

LOUIS ANTOINE SICARD, OF MARSEILLES, FRANCE.

IMPROVEMENT IN APPARATUS FOR PRESERVING FRUITS, &c.

Specification forming part of Letters Patent No. 151,443, dated May 26, 1874; application filed May 21, 1874.

*To all whom it may concern:*

Be it known that I, LOUIS ANTOINE SICARD, of Marseilles, France, have invented an Improved Process of and Apparatus for Producing Vacuum, in order to preserve meat, food, and other organic or animal substances, of which the following is a specification:

The object of my invention is to construct an apparatus for producing vacuum in a given chamber, in combination with a process for effecting, by means of this vacuum in the said chamber, the preservation of meat, food, and other animal or vegetable substances.

The apparatus is based on the principle of the barometric column, and will be fully understood on reference to the annexed drawing, in which—

Figure 1 is a sectional elevation.

A supply-pipe, G, furnished with a cock, H, conducts water from an upper reservoir into the top of the column C, which is surmounted by a vessel, B. The column may be composed of a single pipe, with a central longitudinal division, C', as represented in Fig. 2; or of two juxtaposed pipes, as shown in Fig. 3; or of two concentric pipes, as shown in Fig. 4. It is terminated at its lower end by a cistern or elbow-piece, V, to prevent the admission of external air. A valve, D, worked by a rod, E, and handle F, is fitted to the cistern or elbow-piece, and prevents or allows of the escape of water, according as it is closed or open. The water brought by the supply-pipe G, finding this valve D closed, first fills the column C, then rises into and fills the chamber B above, and drives the air before it through a cock, I, on this chamber. This cock I and the cock H on the supply-pipe are then closed, and the valve D is opened. The water, by its own gravity, begins to flow from the column C, leaving a vacuum behind, until it reaches a height of about thirty-three feet only, where it is retained by the atmospheric pressure. The column C being of greater height than this, it follows that the chamber B has become completely empty of water, and as the air cannot enter it, a vacuum exists therein. A cock, K, between this chamber and another chamber, A, in which the preserving process is carried out, is then opened. The chamber A has previously been shut off from the outer air by the closing of a cock, J, thereon, and of its cover N, which is maintained by pressure-screws L L, a hydraulic joint insuring that the closing is hermetic. Part of the air in the chamber A now passes into the chamber B, forming an equilibrium. The cock K, between the two chambers, is then closed, and also the valve, while the cock H, on the supply-pipe, and the cock I, on the chamber B, are opened. The water which enters, not being able to issue by the opening, which is now closed by the valve D, again fills the chamber B. A vacuum being then produced a second time in this chamber, in the manner above explained, the two chambers are again put into communication by opening the cock K, and the operation is repeated until a complete vacuum is obtained in both the chambers, which is indicated by a gage or manometer, M.

If mercury or other liquid be substituted for the water, the column will be only about thirty-one inches in the case of mercury, and in the case of other liquids a height in proportion to the density of the liquid.

Such being the construction and action of the apparatus I proceed to describe the manner of preserving meat or other animal or vegetable substances with the aid of the same.

The substances to be preserved are placed in a case or box, R, the cover e of which has a conical aperture, *f*, provided with an india-rubber valve, *x*, which is free to rise within a certain limit, viz., up to the piece *g*, which allows it to rise, as seen in Fig. 5. The case R is placed in the chamber A, and when a vacuum is formed in this chamber the air in the case raising the valve *x* escapes so as produce equilibrium with the rarefied air in the chamber. This valve then falls by its own weight, and closes the aperture *f* in the case, (see Fig. 6.) When the perfect or nearly-perfect vacuum has been obtained the cock J, on the chamber A, is opened, and the air entering this chamber forces the valve *x* tightly down upon its seat *f*. The cover of the chamber A being then removed the case R is lifted out, and a tin plate or other capsule, z, is soldered over the valve.

And having now described the nature of my said invention, and in what manner the same is to be performed, I declare that—

I claim—

The combination with the chamber B and vessel A of the double-circulating pipe C, valve D, and supply-duct G, the same being constructed and arranged for joint operation, in the manner shown and described.

In testimony whereof I have signed my name to this specification in the presence of two subscribing witnesses.

L. A. SICARD.

Witnesses:
 Ls. VÉRAN,
 V. ARENE.